(12) United States Patent
Lee et al.

(10) Patent No.: US 9,406,962 B2
(45) Date of Patent: Aug. 2, 2016

(54) ULTRASONIC DEVICE DETECTING CHARGING/DISCHARGING STATUS OF FLOW-CELL PACK

(71) Applicant: Institute of Nuclear Energy Research, Atomic Energy Council, Executive Yuan, R.O.C., Taoyuan County (TW)

(72) Inventors: Ying Sheng Lee, New Taipei (TW); Ning-Yih Hsu, Keelung (TW); Kuan-Hsiang Chen, Taichung (TW); Hwa-Jou Wei, Taoyuan County (TW)

(73) Assignee: INSTITUTE OF NUCLEAR ENERGY RESEARCH, ATOMIC ENERGY COUNCIL, Executive Yuan R.O.C., Lungtan, Taoyuan (TW)

( * ) Notice: Subject to any disclaimer, the term of this patent is extended or adjusted under 35 U.S.C. 154(b) by 267 days.

(21) Appl. No.: 14/266,947

(22) Filed: May 1, 2014

(65) Prior Publication Data

US 2015/0115968 A1 Apr. 30, 2015

(30) Foreign Application Priority Data

Oct. 28, 2013 (TW) .............................. 102138978 A

(51) Int. Cl.
*H01M 8/20* (2006.01)
*H01M 8/18* (2006.01)

(52) U.S. Cl.
CPC ................ *H01M 8/20* (2013.01); *H01M 8/188* (2013.01); *Y02E 60/528* (2013.01)

(58) Field of Classification Search
None
See application file for complete search history.

(56) References Cited

U.S. PATENT DOCUMENTS

| 2001/0028977 A1* | 10/2001 | Kazacos | B60L 11/1879 429/105 |
| 2002/0116054 A1* | 8/2002 | Lundell | A61F 2/2472 623/2.1 |
| 2005/0158614 A1* | 7/2005 | Hennessy | H01M 8/20 429/61 |
| 2009/0017379 A1* | 1/2009 | Inatomi | B60L 11/1816 429/213 |

* cited by examiner

*Primary Examiner* — Patrick Ryan
*Assistant Examiner* — Wyatt McConnell
(74) *Attorney, Agent, or Firm* — Jackson IPG PLLC; Demian K. Jackson

(57) ABSTRACT

A device is provided for detecting a charging and discharging status of a flow-cell pack. During charging and discharging course of the flow-cell pack coordinated with electrolyte storage tanks and actuators, ultrasonic sensors of ultrasonic detection devices are used to sense sonic vibration generated by fluid flow in the flow-cell pack. Thus, the charging and discharging status of the flow-cell pack is detected for adjusting related parameters. The present invention has a simple structure, runs without using extra power supply, does not hinder performance of flow cell, and obtains charging and discharging status of flow cell accurately and rapidly.

6 Claims, 4 Drawing Sheets

ULTRASONIC DEVICE DETECTING CHARGING/DISCHARGING STATUS OF FLOW-CELL PACK

TECHNICAL FIELD OF THE INVENTION

The present invention relates to detecting charging/discharging status; more particularly, relates to using an ultrasonic device with a simple structure to precisely and rapidly detect a charging/discharging status of a flow-cell pack for conveniently adjusting related parameters of the flow-cell pack without extra power supply.

DESCRIPTION OF THE RELATED ART

Usually, for detecting charging/discharging status of a flow-cell pack, a test device is connected with the flow-cell pack to obtain diagram of charging/discharging curves. Then, through an integral function of area in the diagram (Q=C*V), current and voltage of the flow-cell pack are calculated for acquiring the charging/discharging status.

However, the above method not only needs extra power supply for the flow-cell pack, which results in destroying the performance of the flow-cell pack itself; but also runs a complex calculation, which does not accurately and rapidly obtain the charging/discharging status of the flow-cell pack. As a result, adjustments of related parameters of the flow-cell pack becomes difficult owing to not acquiring accurate information about the charging/discharging status of the flow-cell pack.

Hence, the prior art does not fulfill all users' requests on actual use.

SUMMARY OF THE INVENTION

The main purpose of the present invention is to use an ultrasonic device with a simple structure to precisely and rapidly detect a charging/discharging status of a flow-cell pack for conveniently adjusting related parameters of the flow-cell pack without extra power supply.

To achieve the above purpose, the present invention is an ultrasonic device detecting a charging/discharging status of a flow-cell pack, comprising a flow-cell pack, at least two ultrasonic detection devices, at least two electrolyte storage tanks and at least two actuators, where the flow-cell pack comprises at least two inlets and at least two outlets; the ultrasonic detection devices are separately connected to the outlets of the flow-cell pack; the electrolyte storage tanks are separately connected to the ultrasonic detection devices; and the actuators are separately connected to the inlets of the flow-cell pack and the electrolyte storage tanks. Accordingly, a novel ultrasonic device detecting a charging/discharging status of a flow-cell pack is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the structural view showing the preferred embodiment according to the present invention;

DESCRIPTION OF THE PREFERRED EMBODIMENT

Figure 1:
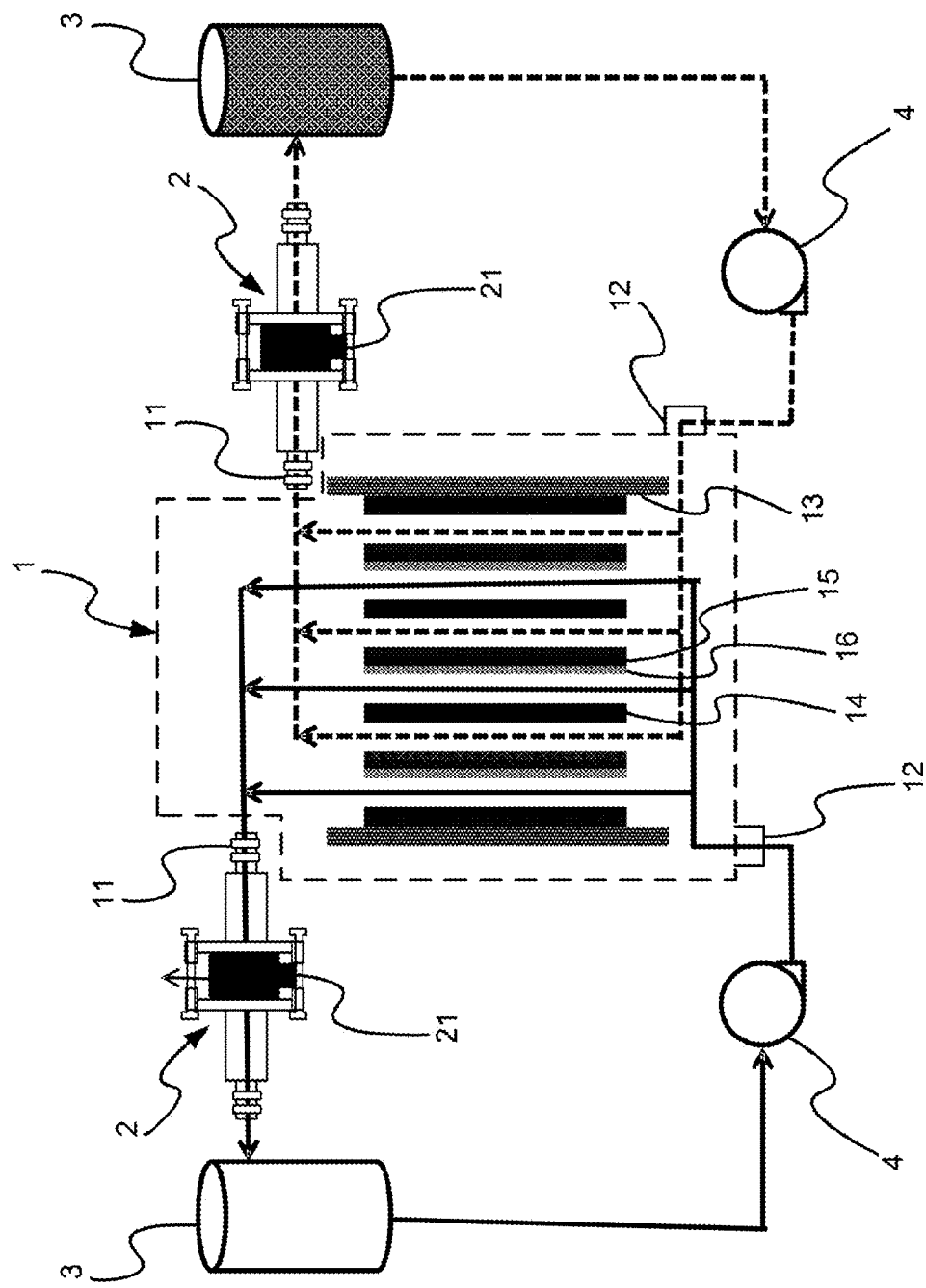
Figure 2:
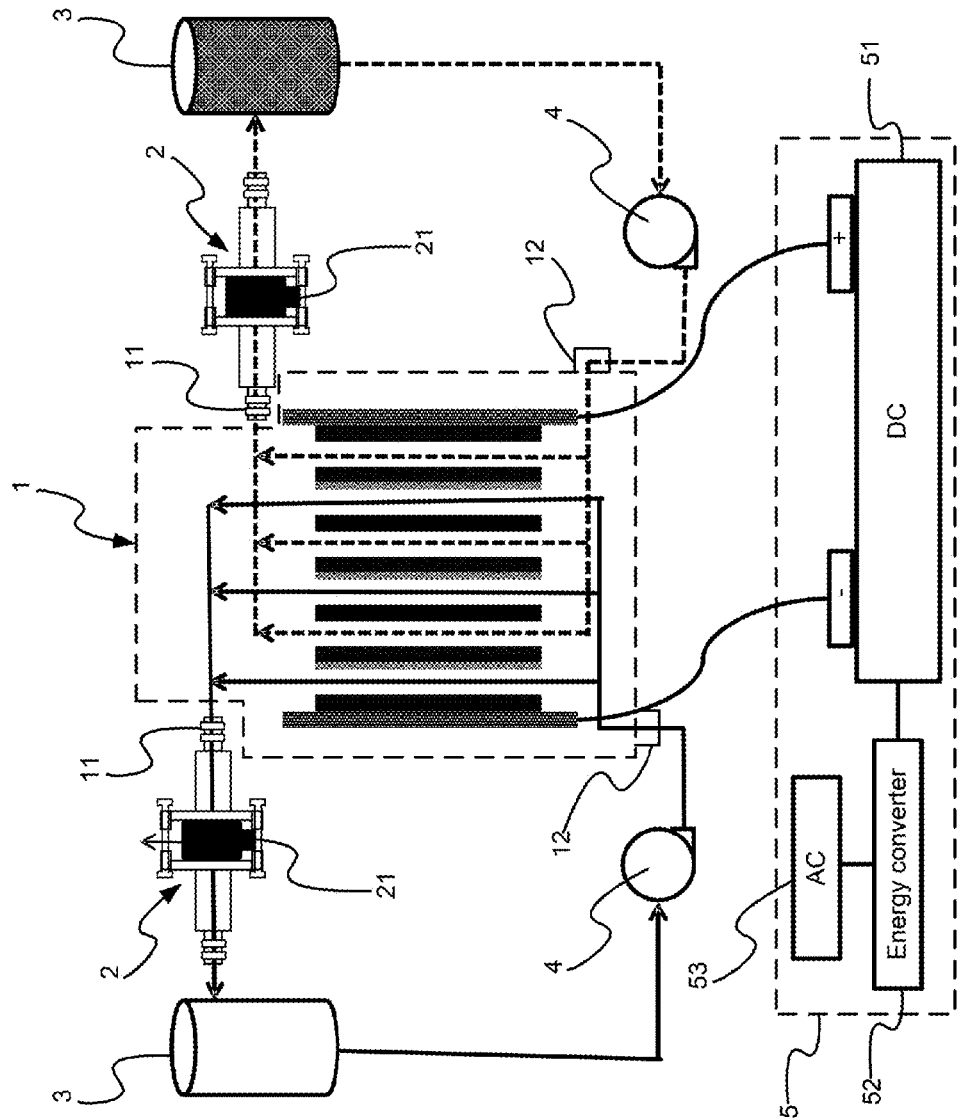
FIG. 2 is the view showing the use of the preferred embodiment.

The following description of the preferred embodiment is provided to understand the features and the structures of the present invention.

Please refer to FIG. 1 to FIG. 4, which are a structural view showing a preferred embodiment according to the present invention; a view showing use of the preferred embodiment; a view showing charging curves of a positive electrode; and a view showing the discharging curves of the negative electrode. As shown in the figures, the present invention is an ultrasonic device detecting a charging/discharging status of a flow-cell pack, comprising a flow-cell pack 1, at least two ultrasonic detection devices 2, at least two electrolyte storage tanks 3 and at least two actuators 4.

The flow-cell pack 1 has at least two outlets 11 and two inlets 12. The flow-cell pack 1 comprises at least two conductive plates 13; a plurality of bipolar plates 14, each of which is set between every two neighboring conductive plates 13; a plurality of ion-exchange membranes 15, each of which is set between every two neighboring bipolar plates 14; and a plurality of electrodes 16, each of which is corresponding to another electrode 16 to clip an ion-exchange membrane 15 at two side surfaces. The conductive plates 13 comprises positive-electrode plates and negative-electrode plates.

Each of the ultrasonic detection devices 2 is separately connected to each of the outlets 11 of the flow-cell pack 1; and has an ultrasonic sensor 21.

Each of the electrolyte storage tanks 3 is separately connected to each of the ultrasound detection devices 2.

Each of the actuators 4 are connected to each of the outlets 12 of the flow-cell pack 1; and each of the electrolyte storage tanks 3. The actuator 4 is a pump.

Thus, during the charging and discharging course of the flow-cell pack 1 coordinated with the electrolyte storage tanks 3 and the actuators 4, the ultrasonic sensors 21 of the ultrasonic detection devices 2 senses sonic vibration generated by fluid flow in the flow-cell pack 1 to further detecting the charging and discharging status of the flow-cell pack 1 for adjusting related parameters. The present invention has a simple structure, runs without using extra power supply, does not hinder performance of flow cell, and obtains charging and discharging status of flow cell accurately and rapidly.

On using the present invention for test, the flow-cell pack 1 is further connected with a test platform 5, where the test platform 5 comprises a direct-current (DC) power supply 51 connected with the conductive plates 13; an energy converter 52 connected with the DC power supply 51; and an alternating-current (AC) power supply 53 connected with the energy converter 52. Then, the following steps are processed:

(a) An amount of vanadyl sulfate crystal is dissolved in two mores (M) of sulfuric acid to obtain 150 milliliters (ml) of a vanadyl sulfate solution.

(b) At first, 50 ml of the above solution is put in each of the electrolyte storage tanks 3 (Each electrolyte storage tank 3 is positive or negative according to the conductive plate 13 connected).

(c) The test platform 5 is started for charging under the following conditions of current: 1 ampere (A); flow rate: 3 liters per hour (L/hr); protection voltage: 1.8 volts (V); and temperature: 25 Celsius degrees (° C.). Thus, trivalent and pentavalent vanadium solutions having specific concentrations are formed in the electrolyte storage tanks 3.

(d) 50 ml of the vanadyl sulfate solution obtained in step (a) is taken to replace a pentavalent vanadium solution in one of the (positive) electrolyte storage tanks 3.

(e) The ultrasonic detection devices 2 are separately set in the paths of and connected between the outlets 11 of the flow-cell pack 1 and the electrolyte storage tanks 3.

(f) The test platform 5 is started for charging and discharging under the following conditions of current: 1 A; flow rate: 3 L/hr; protection voltage: 1.8V; and temperature: 25° C.

(g) Periodically, charging and discharging velocities and related parameters obtained by the ultrasonic detection devices 2 are recorded.

Figure 3:
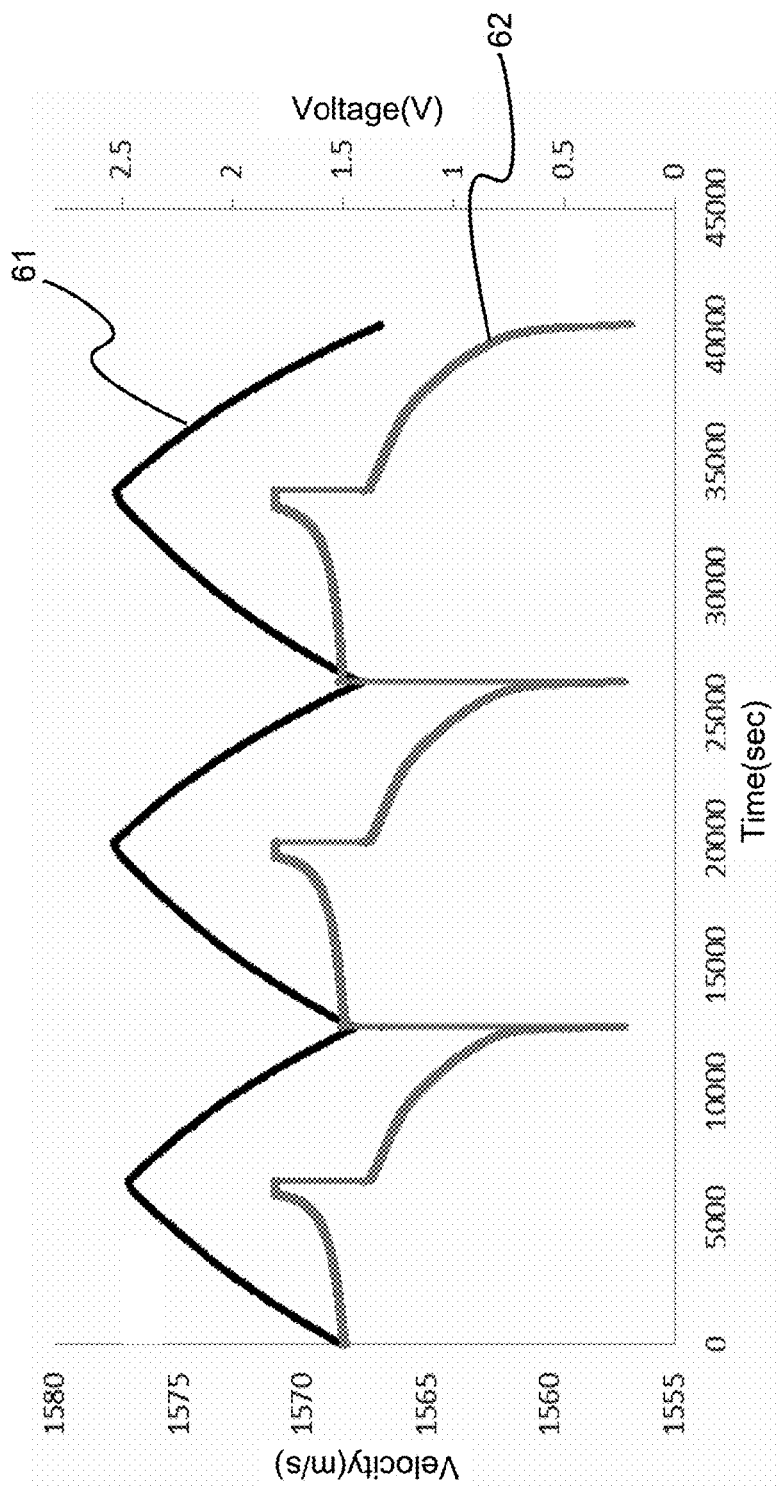
FIG. 3 is the view showing the charging curves of the positive electrode.
Figure 4:
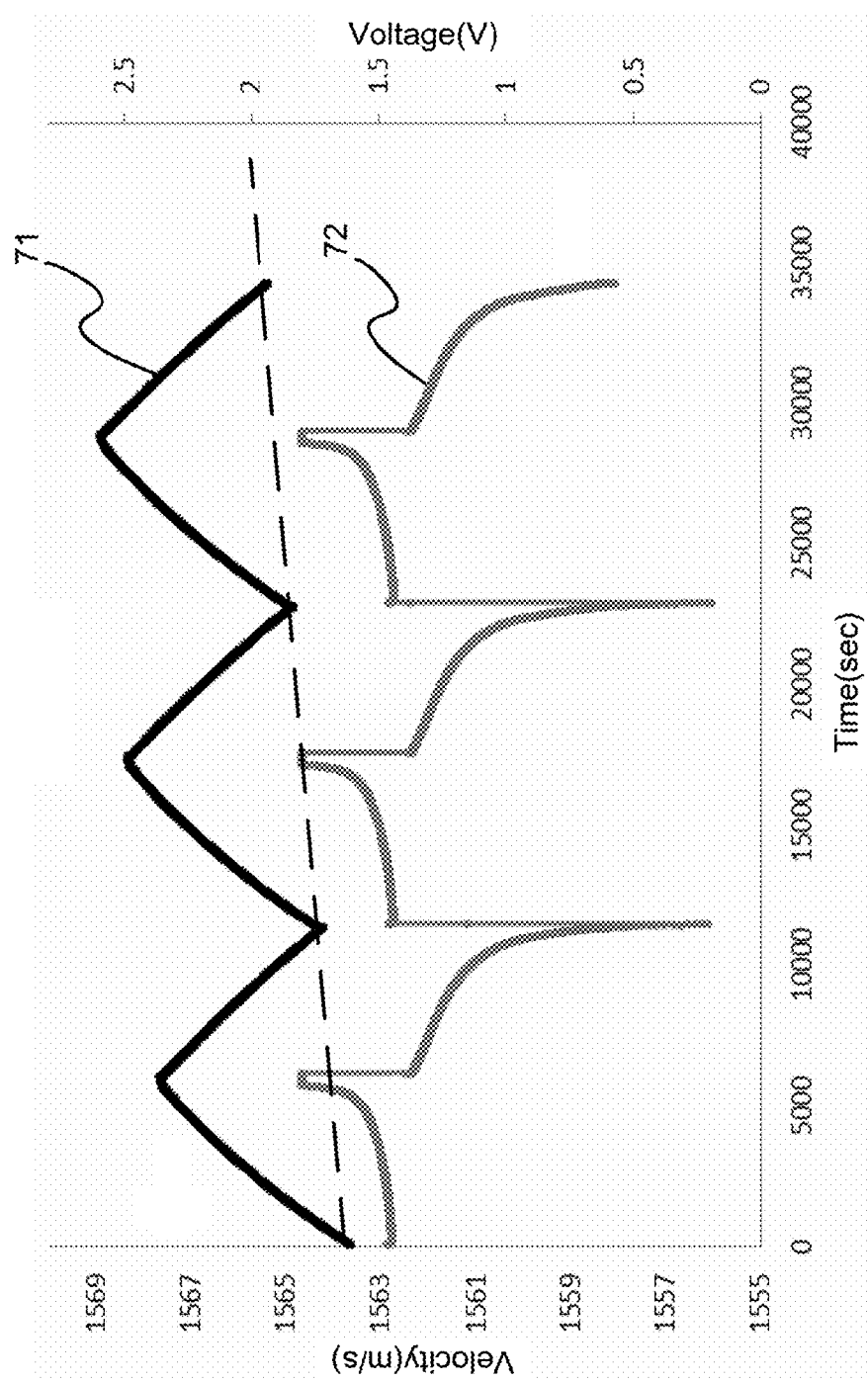
FIG. 4 is the view showing the discharging curves of the negative electrode.

(h) Diagrams of ultrasonic velocities under different charge and discharge statuses for a particular concentration are drown (as shown in FIG. 3 and FIG. 4).

(i) The temperature and concentration are adjusted with step (f) to step (h) processed repeatedly.

When the flow-cell pack 1 are charged and discharged through the positive and negative electrodes, the test platform 5 has the same velocity curves 62,72. By detection with the ultrasonic detection devices 2, it is found that the charging and discharging velocity curves 61,72 shown in FIG. 4 both have a linear slope. Therein, whether the flow-cell pack 1 is fully charged/discharged can be clearly seen. Conclusively, the present invention uses the ultrasonic detection devices 2 to detect the charging/discharging status of the flow-cell pack 1 for adjusting related parameters of the flow-cell pack 1 with a simple structure, while no extra power supply is used and performance is not hindered for acquiring the charging/discharging status accurately and rapidly.

To sum up, the present invention is an ultrasonic device detecting a charging/discharging status of a flow-cell pack, where ultrasonic detection devices are used to detect a charging/discharging status of a flow-cell pack for adjusting related parameters of the flow-cell pack with a simple structure; and no extra power supply is used and performance is not hindered for acquiring the charging/discharging status accurately and rapidly.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An ultrasonic device detecting a charging/discharging status of a flow-cell pack, comprising:

a flow-cell pack, said flow-cell pack having at least two inlets and at least two outlets;

at least two corresponding ultrasonic detection devices separately connected to said outlets of said flow-cell pack and indicating flow rates within respective said outlets;

at least two electrolyte storage tanks separately connected to said ultrasonic detection devices and connected with the flow-cell pack;

at least two actuators separately connected to said inlets of said flow-cell pack and said electrolyte storage tanks; and a test platform connected with the flow-cell pack, wherein the test platform indicates a fully charged state of the flow-cell pack by detecting a peak of indicated flow rates within the respective outlets.

2. The ultrasonic device according to claim 1, wherein said flow-cell pack comprises at least two conductive plates;

a plurality of bipolar plates, each of said bipolar plates being located between every two neighboring ones of said conductive plates;

a plurality of ion-exchange membranes, each of said ion-exchange membranes being located between every two neighboring ones of said bipolar plates; and a plurality of electrodes, each of said electrodes being corresponding to another one of said electrodes to clip one of said ion-exchange membranes at two side surfaces of said one of said ion-exchange membranes.

3. The ultrasonic device according to claim 2, wherein said conductive plates comprises at least one positive-electrode conductive plate; and at least one negative-electrode conductive plate.

4. The ultrasonic device according to claim 1, wherein said test platform comprises a direct-current (DC) power supply connected with said conductive plates;

an energy converter connected with said DC power supply; and an alternating-current (AC) power supply connected with said energy converter.

5. The ultrasonic device according to claim 1, wherein each of said ultrasonic detection devices has an ultrasonic sensor.

6. The ultrasonic device according to claim 1, wherein said actuator is a pump.

\* \* \* \* \*